Sept. 12, 1939.　　　　　G. FRENGER　　　　　2,173,013
APPARATUS FOR THE COMBUSTION OF WASTE MATERIALS
Filed Sept. 7, 1937　　　2 Sheets-Sheet 1
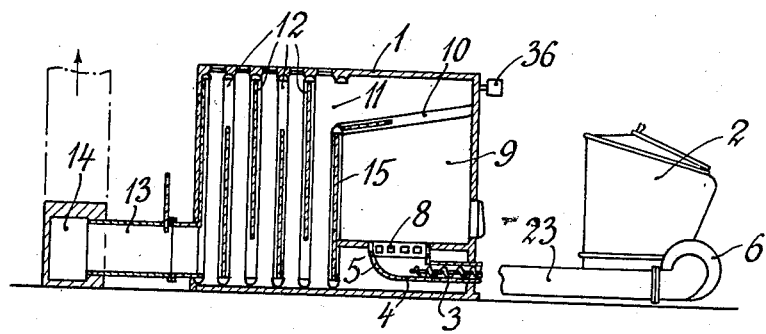
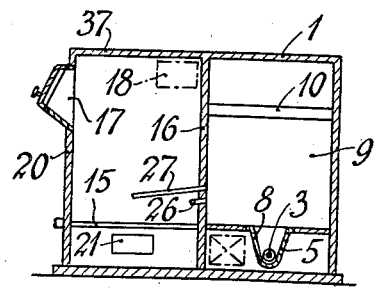
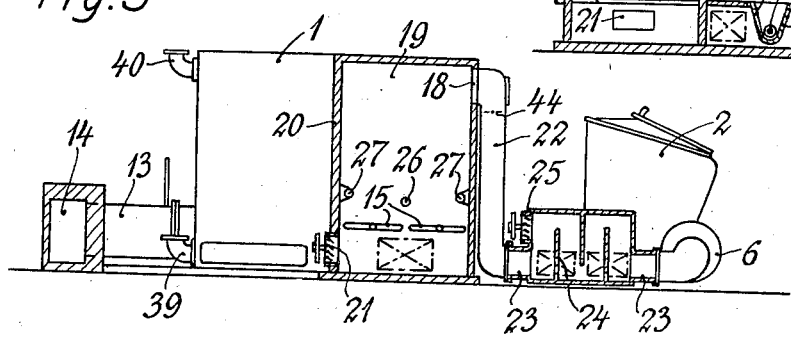
G. Frenger
Inventor
By Glascock Downing & Seebold
Attys.

Sept. 12, 1939.　　　　　G. FRENGER　　　　2,173,013
APPARATUS FOR THE COMBUSTION OF WASTE MATERIALS
Filed Sept. 7, 1937　　2 Sheets-Sheet 2
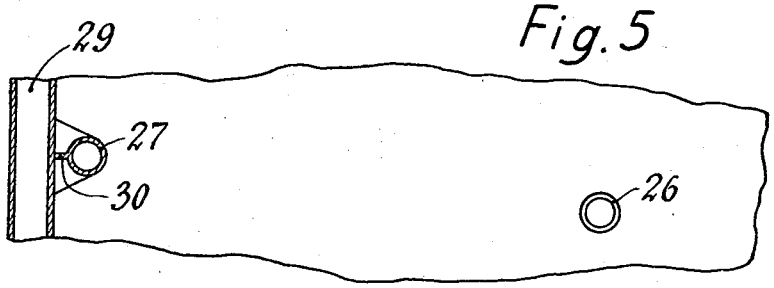
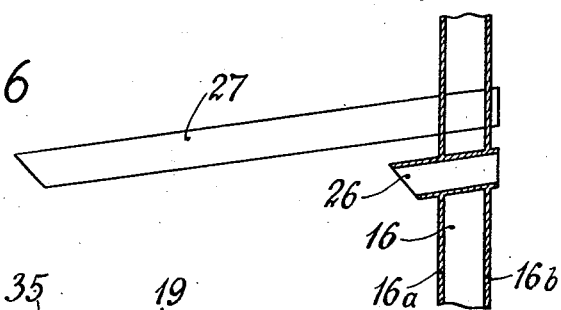
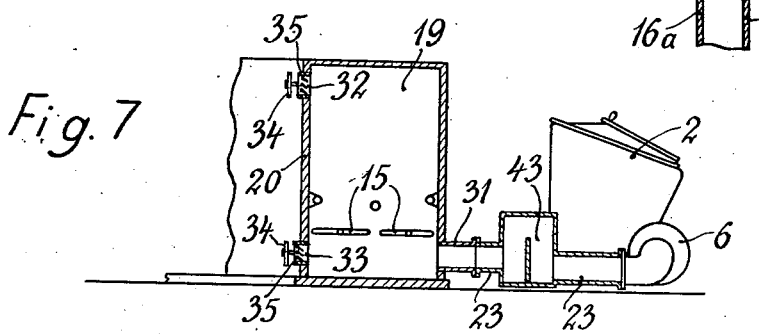
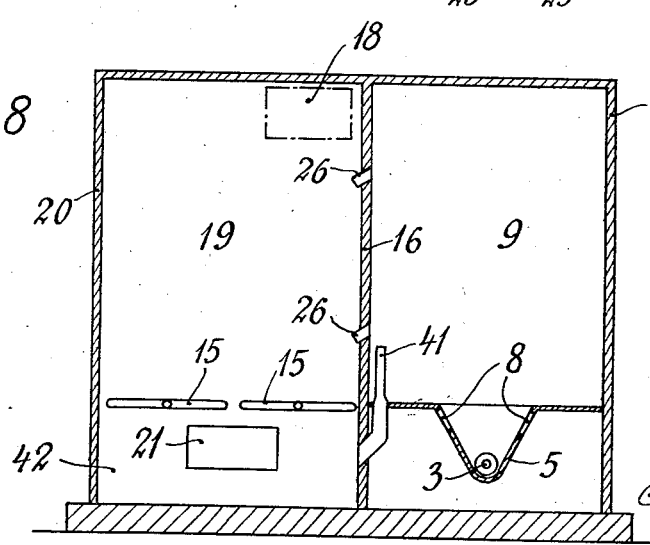
G. Frenger
inventor
By Glascock, Downing & Seebold
Attys.

Patented Sept. 12, 1939

2,173,013

UNITED STATES PATENT OFFICE 2,173,013

APPARATUS FOR THE COMBUSTION OF WASTE MATERIALS

Gunnar Frenger, Oslo, Norway

Application September 7, 1937, Serial No. 162,749
In Sweden August 27, 1937

6 Claims. (Cl. 110—8)

The present invention relates to boilers for central heating or hot water production combined with a garbage combustion boiler, wherein the garbage or other waste material burns in a magazine, and wherein the evil smelling gases of combustion from the garbage combustion are subjected to a supplementary combustion in the central heating boiler, the latter being equipped with automatic firing device, preferably with a stoker.

Firing plants of the above kind are principally used for heating and for burning of garbage in apartment buildings.

The combustion is controlled automatically by a thermostatic device which stops and starts the fan of the stoker and the feeding device. When the stoker is in operation, the garbage combustion gases are pressed by means of the fan through the fuel layer in the stoker retort.

In the resting periods for the stoker the fan draught ceases, and during these periods only the natural stack draught draws the waste gases from the garbage combustion boiler. Thereby the combustion in the garbage boiler is highly reduced, and if the garbage is wet, the fire in the garbage boiler might become extinguished during the resting periods of the stoker. Besides at the moment the stoker stops, small explosions and smoke extrusion from the garbage combustion boiler may easily take place.

The present invention eliminates the above-named inconveniences and secures a drying and a rapid combustion of the garbage. According to the invention use is made of the well-known arrangement of at least two combustion chambers connected with each other in series, the first chamber serving for the combustion of garbage and the other one for the combustion of normal, high-value fuel, the gases of combustion from the first fire or chamber being forced through a connecting channel to the second combustion chamber.

The invention consists in a method, wherein a larger or less portion of the very hot gases in the second combustion chamber is passed back to the garbage combustion chamber in order to effect herein a drying or a reigniting of the garbage and also a higher temperature in this chamber and in the gases forced to the second chamber. This is obtained by arranging, in addition to the said connecting channel and separated from and independent of the same, one or more return channels or openings. Preferably the return channel or channels or openings are arranged in a partition between both combustion chambers, said partition being preferably water-cooled.

When the fan and consequently the stoker is in operation, thus a miner portion of the hot combustion gases developed in the second chamber (the chamber for supplementary combustion) passes from its flame zone direct to the garbage combustion chamber, wherein therefore a temperature prevails which is higher than that corresponding to the combustion of garbage taking place therein and which may be adjusted as desired by choosing a suitable cross section of the return channels. Thereby also a direct radiation through the said return channels from the flame zone to the garbage body in the first chamber is made possible, the latter chamber being frequently called the garbage magazine. But when the fan and the stoker are not in operation, the second chamber, the flame chamber, which constitutes a portion of the stoker boiler, is subjected only to a very small partial vacuum of 1 to 2 mm. water column, produced by the natural stack draught. But when the fan is in operation, the garbage magazine is subjected to a considerably higher partial vacuum than the flame chamber, this partial vacuum corresponding to the sucking pressure of the fan, and the hot gases therefore pass from the second chamber to the first chamber.

When the fan stops, both combustion chambers will be subjected to practically the same partial vacuum corresponding to the stack draught. In case of small explosions taking place in the garbage magazine, gases from the same may pass through the return channels into the stoker boiler, whereby smoke extrusion from the boiler is prevented.

The invention is illustrated in three embodiments in the drawings.

Figure 1 shows an elevation of a plant partly in longitudinal section on the line 1—1 in Figure 2.

Figure 2 shows diagrammatically a corresponding plan view partly in section.

Figure 3 shows diagrammatically a sectional view, substantially on the line 3—3 in Figure 2.

Figure 4 shows diagrammatically a sectional view, substantially on the line 4—4 in Figure 2.

Figures 5 and 6 show in detail and drawn to a larger scale the manner wherein the return channels are preferably arranged according to the invention.

Figure 7 shows another embodiment of the garbage combustion boiler.

Figure 8 shows a third embodiment.

The central heating boiler 1 has in the example shown in Figures 1-4 an ordinary underfed stoker. The fuel which is preferably coal, is fed from the fuel store 2 by means of screw 3 through pipe 4 into the upwardly open retort 5 and burns therein by means of air under pressure which is forced by fan 6 through pipe 7 and holes 8 into the retort 5. The gases from the flame chamber or combustion chamber 9 of the boiler 1 in the bottom of which the retort is arranged, pass at 10 out into the smoke gas channel 11.

The smoke channel 11 may consist of vertical portions arranged in zigzag and formed by water-cooled partitions 12, and the smoke gases pass further through the smoke outlet 13 and channel 14 to the stack (not shown).

The garbage combustion boiler 20 is provided with tiltable grates 15 and is preferably separated from the combustion chamber of the stoker boiler by means of a water-cooled partition 16. The latter and also the hollow, water-cooled walls are in the drawings shown diagrammatically and are therefore hatched. Figure 6 shows the partition 16 in detail with the two spaced plates 16a and 16b and a space between them wherein the water circulates.

The boiler 20 has opening 17 (Figure 4) with a door for introduction of the garbage, a side outlet 18 for the escape of combustion gases from the combustion chamber (the magazine) 19 and an inlet 21 for combustion air under the grates 15.

From the garbage combustion chamber 19 the evil smelling gases escape above through the outlet 18 to a side channel 22 with damper 44, the fan 6 sucking the gases from the channel 22 through channel 23 and forcing them into the pipe 7. In Figure 3 a combined tar condenser and ash separator 24 is shown as being arranged in the channel 23 between the fan 6 and the garbage combustion boiler 20. In the tar condenser 24 the normal fresh air inlet 25 of the fan is arranged and provided with Venetian blind-like blades. Further an air inlet 21 for the garbage combustion boiler is shown.

The said return channels are arranged in the partition 16 and may be simple openings in this wall or they may be, as shown in the drawings, shorter pipes 26 in connection with longer pipes 27 which are attached in the plates 16a, 16b of the wall 16, as indicated in Figure 6, for instance one short and two long pipes.

The long pipes 27 may be arranged along the water-cooled side walls 29 of the boiler 20 and be fixed thereto by ribs 30 (Figure 5). Of course a suitable number of the pipes 26, 27 may be arranged so that a suitable total area of the return channels is obtained.

If the inlet 21 is closed, it is possible to have only hot combustion gases from the supplementary combustion chamber 9 circulate through the chamber 19 of the garbage combustion boiler by means of the return channels 26, 27. The latter are preferably arranged at an inclination inwardly towards the garbage combustion boiler 20.

When the fan 6 is not in operation, small quantities of garbage combustion gases may flow through 26, 27 directly into the chamber 9 of the supplementary combustion boiler, whereby tar products are settled upon the water-cooled portions of the inside of the return channels.

However, when the fan 6 starts again, combustion gases of high temperature will pass in the opposite direction from 9 to 19, and the tar products will melt in 26 and 27 momentarily and on account of the inclination of these channels the said products will flow back to the chamber 19 of the garbage combustion boiler.

As already said the temperature in the channel 23 is higher than would apply without the return channels and may easily be so adjusted that it is higher than the melting point of the tar products. In such case tar cannot be settled in the channels of the fan system.

The second alternative is shown in Figure 7. Here the smoke outlet 31 from the garbage combustion boiler 20 is arranged at the bottom under the grate 15, whereas the fresh air inlet 32 is arranged at the top of the chamber 19. Besides, a fresh air inlet 33 is here arranged in the bottom of the garbage combustion boiler 20.

Both fresh air inlets 32, 33 are provided with plate regulation 34 and Venetian blinds 35 which hang down and close the inlets when the fan 6 stops.

In last-named alternative a tar separator 43 is arranged, but this latter in this case need not be provided with any fresh air inlet as at 25 in Figure 3.

Besides, in the drawings a thermostat 36 (Figures 1, 2) is shown which in well-known manner starts and stops the stoker motor 38 by means of electrical conductors 37 and relay (not shown). Further pipe bands 39, 40 are shown in order to connect the boiler 1 with heating plant or with apparatus for hot water preparation.

In Figure 8 pipes 26 are shown at two different heights in the chamber 19, one being arranged somewhat above the grate 15 and the other one higher up in the partition 16. Through the pipes 26 radiating heat from the hot flame chamber 9 and also hot gases (if the fan 6 is in operation) will effect a drying and an igniting of the garbage in the chamber 19. Also vertical pipes 41 may be arranged which connect the chamber 42 under the grates 15 with the chamber 9, the pipes 41 being open at top. They may be arranged for instance between the lower pipes 26 and have the effect of sucking in a portion of the hot gases from the chamber 9 under the grate 15. The air inlet 21 and the smoke outlet 18 and the other arrangement may be as shown in Figures 1 to 4. By this arrangement a drying and automatic igniting and reigniting of the garbage in the magazine 19 will take place during the regulation of the combustion in the chamber 9 caused by the thermostat 36 in dependency of the temperature of the water in the boiler 1. If the magazine is filled with garbage high up in the chamber 19, the upper pipes 26 will ignite the garbage at the top, whereas the lower pipes 26 will maintain the igniting or the combustion further down at the grate. The pipe 41 will effect a preheating of the fresh air supplied under the grate 15.

I claim:

1. In a plant for the combustion of waste materials such as household waste products or other low-value fuel, the combination of a first combustion chamber for burning waste materials, a second combustion chamber for burning normal, high-value fuel, a connecting channel between the first chamber and the second chamber, means for causing the gases of combustion developed in the first chamber to pass through the said channel into the combustion zone in the said second chamber, and means for passing a portion of the hot gases of combustion in the second chamber back into the first chamber.

2. In a plant for the combustion of waste materials such as household waste products or other low-value fuel, the combination of a first combustion chamber for burning waste materials, a second combustion chamber for burning normal, high-value fuel, a connecting channel between the first chamber and the second chamber, a fan for sucking the gases of combustion from the first chamber through the said channel and forcing the said gases through the combustion zone in the second chamber, and a passage other than the said channel and through which a portion of the hot gases of combustion in the second chamber is sucked by the fan back into the first chamber.

3. In a plant for the combustion of waste materials such as household waste products or other low-value fuel, the combination of a first combustion chamber for burning waste materials, a second combustion chamber for burning normal, high-value fuel, said combustion chambers being separated by a partition, a connecting channel between the first chamber and the second chamber, a fan in said channel for causing the gases of combustion developed in the first chamber to pass by the said channel through a glowing fuel layer in the second chamber into same, said partition having an opening for returning hot gases of combustion from the said glowing fuel layer in the second chamber to the garbage in the first chamber.

4. A plant according to claim 3, arranged as a boiler and wherein the said partition is a water-cooled member of the boiler and the opening constitutes a perforation in the said water-cooled partition.

5. In a plant for the combustion of waste materials such as household waste products or other low-value fuel, the combination of a first combustion chamber for burning waste materials, a second combustion chamber for burning normal, high-value fuel, a connecting channel between the first chamber and the second chamber, a fan system arranged to suck the gases of combustion developed in the first chamber from same and to force said gases by the said channel through a glowing fuel layer in the second chamber into same so as to set up a somewhat lower pressure in the first than in the second chamber, and passages arranged for causing a portion of the hot gases of combustion in the second chamber to return to the first chamber owing to the said lower pressure.

6. A plant according to claim 5, wherein the said passages are made as channels inclined downwardly from the second into the first combustion chamber.

GUNNAR FRENGER.